United States Patent
Josefsson et al.

(10) Patent No.: US 9,981,578 B2
(45) Date of Patent: May 29, 2018

(54) VEHICLE ASSEMBLY AND METHOD OF ALLOCATING POWER IN THE SAME

(71) Applicant: KONGSBERG AUTOMOTIVE AB, Mullsjö (SE)

(72) Inventors: Daniel Josefsson, Falköping (SE); Lars Planelid, Älmestad (SE); Karl-Johan Krantz, Huskvarna (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 478 days.

(21) Appl. No.: 14/765,706

(22) PCT Filed: Feb. 22, 2013

(86) PCT No.: PCT/IB2013/000347
§ 371 (c)(1),
(2) Date: Aug. 4, 2015

(87) PCT Pub. No.: WO2014/128518
PCT Pub. Date: Aug. 28, 2014

(65) Prior Publication Data
US 2015/0375653 A1  Dec. 31, 2015

(51) Int. Cl.
*B60L 1/02* (2006.01)
*B60N 2/56* (2006.01)

(52) U.S. Cl.
CPC .................. *B60N 2/5685* (2013.01)

(58) Field of Classification Search
CPC ...... B60N 2/5685; B60N 2/5678; B60N 2/56; H05B 1/0238; H05B 1/0236; H05B 3/34;
(Continued)

(56) References Cited

U.S. PATENT DOCUMENTS

2003/0057768 A1  3/2003  Liao et al.
2005/0085968 A1  4/2005  Panic
(Continued)

FOREIGN PATENT DOCUMENTS

DE  102008047291 A1  4/2010
EP  1060943 A3  8/2003
(Continued)

OTHER PUBLICATIONS

Machine-Assisted English Language translation of DE102008047291, extracted from espacenet.com database on Aug. 4, 2015. 20 pages.
(Continued)

*Primary Examiner* — Shawntina Fuqua
(74) *Attorney, Agent, or Firm* — Howard & Howard Attorneys PLLC

(57) ABSTRACT

A vehicle assembly and method for allocating power in the same is disclosed. A plurality of vehicle seats each have heating zones disposed in cushion and back seating surfaces of the vehicle seats. A controller controls power to the heating zones. At least two of the heating zones are activated such that the heating zones emit heat. Heat demand information associated with the activated healing zones is generated. The generated heat demand information is provided to the controller. The controller is utilized to determine an amount of power available for consumption by all of the activated heating zones using the heat demand information. The controller actively allocates power between the activated heating zones according to the determined amount of power available such that an actual amount of power consumed by all of the activated heating zones does not exceed the determined amount of power available.

25 Claims, 4 Drawing Sheets

(58) Field of Classification Search
CPC ........ H05B 3/342; H05B 3/345; H05B 3/347; H05B 3/36; H05B 2203/003; H05B 2203/004; H05B 2203/005; H05B 2203/007

See application file for complete search history.

(56) References Cited

U.S. PATENT DOCUMENTS

| | | |
|---|---|---|
| 2005/0099043 A1 | 5/2005 | Kim |
| 2008/0047277 A1 | 2/2008 | Kim |
| 2009/0001778 A1 | 1/2009 | Nathan et al. |
| 2010/0102625 A1 | 4/2010 | Karimi et al. |

FOREIGN PATENT DOCUMENTS

| | | |
|---|---|---|
| EP | 2156971 A1 | 2/2010 |
| GB | 2427039 A | 12/2006 |
| WO | WO2012168968 A1 | 12/2012 |

OTHER PUBLICATIONS

Machine-Assisted English Language translation of WO2012168968, extracted from espacenet.com database on Aug. 5, 2015. 26 pages.

International Search Report of PCT/IB2013/000347; dated Nov. 28, 2013; 2 pages.

Time

— ·· — ··· First Allocated Amount of Power
— · — · — Temperature of First Activated Heating Zone
— — — — — Second Allocated Amount of Power
·············· Temperature of Second Activated Heating Zone
——————— Determined Amount of Power Available for Consumption by all Activated Heating Zones Based on Power Consumption Limit

VEHICLE ASSEMBLY AND METHOD OF ALLOCATING POWER IN THE SAME

CROSS REFERENCE TO RELATED APPLICATIONS

This application is the U.S. National Stage of International Patent Application No. PCT/IB2013/000347, filed on Feb. 22, 2013, the disclosure of which is hereby incorporated by reference.

BACKGROUND OF THE INVENTION

1. Field of the Invention

The subject invention generally relates to a vehicle assembly having a plurality of heating zones, and more specifically, a method of allocating power between the plurality of heating zones.

2. Description of Related Art

Many vehicle assemblies currently include a component, such as a seat, that has heating zones. For seats, the heating zones are typically disposed in seat cushions and seat backs of the seat. The heating zones include a heating source disposed therein for emitting heat in the respective seat cushions and/or seat backs when the heating zones are activated.

Conventional vehicle assemblies provide little control over how electrical power is distributed to each of the heating zones. Some conventional vehicle assemblies merely provide manual control or adjustability over the power distribution to the heating zones. For example, such vehicle assemblies may only provide a switch for enabling a vehicle occupant to control the amount of power to the heating zone.

Vehicles are becoming increasingly dependent upon electrical power. This is especially true for electric vehicles, such as hybrid electric vehicles (HEVs), plug-in electric vehicles (PEVs), and battery electric vehicles (BEVs). In such vehicles, the power which is available for consumption is in short supply. Therefore, efficient and intelligent power management of heating zones is critical.

However, conventional vehicle assemblies inefficiently allocate power between activated heating zones. Such inefficiency in allocating power is unfavorable in such electric vehicles having limited available power. Conventional vehicle assemblies disadvantageously consume excessive amounts of power. Furthermore, conventional vehicle assemblies inadequately distribute available vehicle power to activated heating zones. As such, conventional vehicle assemblies do not sufficiently produce optimal comfort to occupants interfacing with the heating zones. Additionally, conventional vehicle assemblies disadvantageously reduce the ability to manage overall power consumption in the vehicle.

Therefore, there remains an opportunity to develop a vehicle assembly and method of allocating power between heating zones in the vehicle assembly which avoids at least the aforementioned problems.

SUMMARY OF THE INVENTION AND ADVANTAGES

In one embodiment, the subject invention provides a vehicle assembly including at least one vehicle component. A plurality of heating zones are defined by the at least one vehicle component. Each of the heating zones is configured to be activated and emit heat. A controller is configured to control power to the plurality of heating zones. The controller is configured to receive heat demand information generated in relation to the activated heating zones. The controller is configured to determine an amount of power available for consumption by all of the activated heating zones using the heat demand information. The controller is configured to actively allocate power between the activated heating zones according to the determined amount of power available such that an actual amount of power consumed by all of the activated heating zones does not exceed the determined amount of power available.

In another embodiment, the subject invention provides a vehicle assembly including a plurality of vehicle seats. Each of the plurality of vehicle seats has a cushion seating surface and a back seating surface. Each of a plurality of heating zones are disposed in at least one of the cushion and the back seating surfaces of at least one of the plurality of vehicle seats. Each of the heating zones is configured to be activated and emit heat. A controller is configured to control power to the plurality of heating zones. The controller is configured to receive heat demand information generated in relation to the activated heating zones. The controller is configured to determine an amount of power available for consumption by all of the activated heating zones using the heat demand information. The controller is configured to actively allocate power between the activated heating zones according to the determined amount of power available such that an actual amount of power consumed by all of the activated heating zones does not exceed the determined amount of power available.

Additionally, the subject invention provides a method of allocating power in a vehicle assembly. The vehicle assembly includes a plurality of vehicle seats each having a cushion seating surface and a back seating surface. Each of a plurality of heating zones are disposed in at least one of the cushion and back seating surfaces of at least one of the plurality of vehicle seats. A controller is configured to control power to the plurality of heating zones. The method includes the step of activating at least two of the plurality of heating zones such that the heating zones emit heat. The method includes the step of generating heat demand information associated with the activated heating zones. The method includes the step of providing the generated heat demand information to the controller. The method includes the step of utilizing the controller to determine an amount of power available for consumption by all of the activated heating zones using the heat demand information. Furthermore, the method includes the step of actively allocating power between the activated heating zones according to the determined amount of power available such that an actual amount of power consumed by all of the activated heating zones does not exceed the determined amount of power available.

Accordingly, the vehicle assembly and method provide efficient power management between the activated heating zones, especially for vehicles having limited electrical power, such as electric vehicles. By having the controller configured to determine the amount of power available for consumption using the heat demand information, the vehicle assembly and method intelligently, dynamically, and efficiently determine the amount of power that is available for consumption by each of the activated heating zones. Furthermore, by having the controller actively allocate power between the activated heating zones such that the actual amount of power consumed by all of the activated heating zones does not exceed the determined amount of power available, the vehicle assembly and method effectively reduce the actual amount of power consumed by all of the activated heating zones. The vehicle assembly and method advantageously improve heating response times in activated heating zones. Moreover, the vehicle assembly and method provide greater control over how electrical power is consumed by and between the activated heating zones. As such, by controlling the actual amount of power consumed, the vehicle assembly and method increase the ability to manage overall electrical power consumption in vehicle electrical systems.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION OF THE INVENTION

Figure 5:
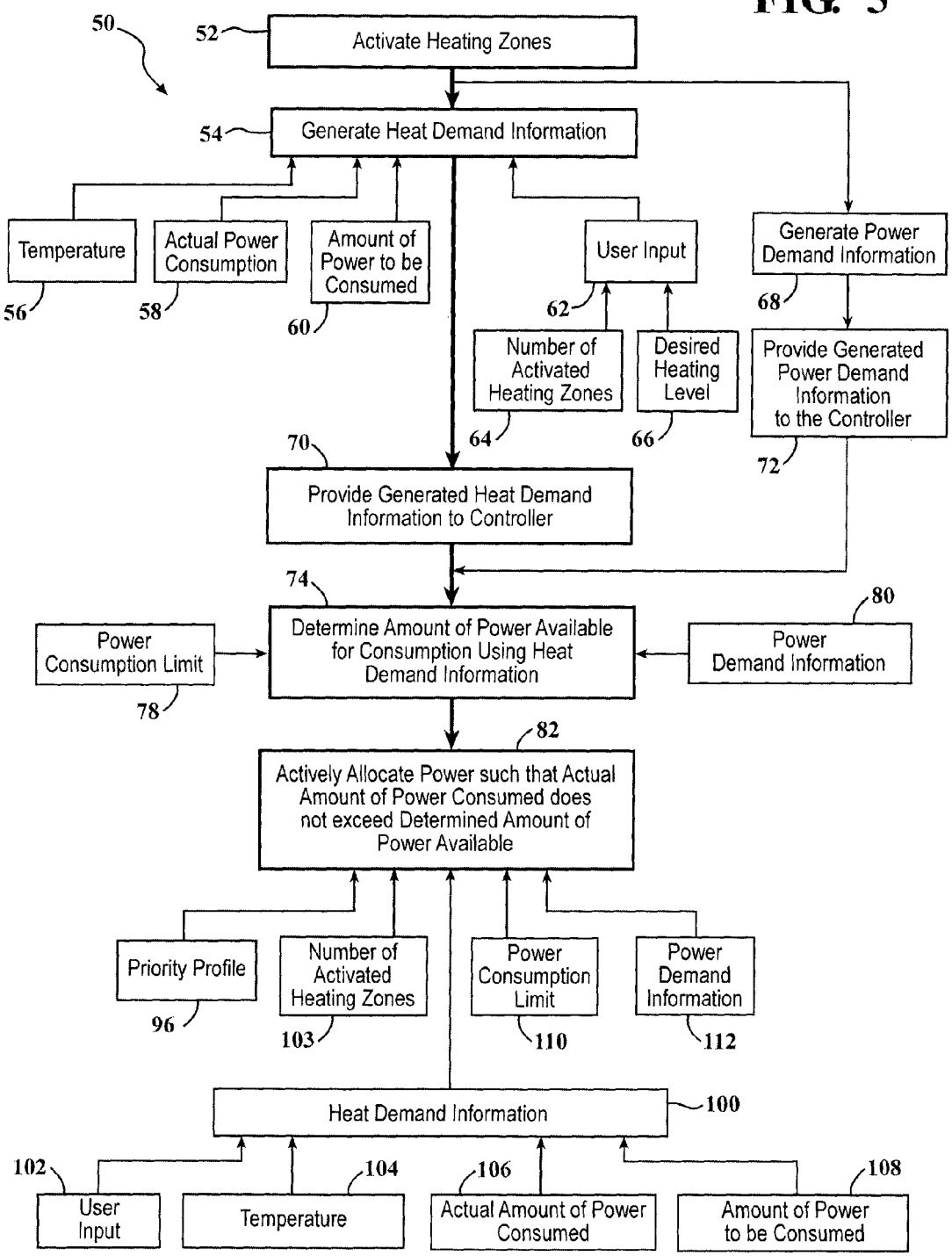
FIG. 5 is a flow chart illustrating a method of allocating power in the vehicle assembly, according to one embodiment of the present invention.

Referring to the Figures, wherein like numerals indicate like or corresponding parts throughout the several views, a vehicle assembly is generally shown at 10. A method 50 of allocating power in the vehicle assembly 10 is further provided, as shown in FIG. 5.

Figure 1:
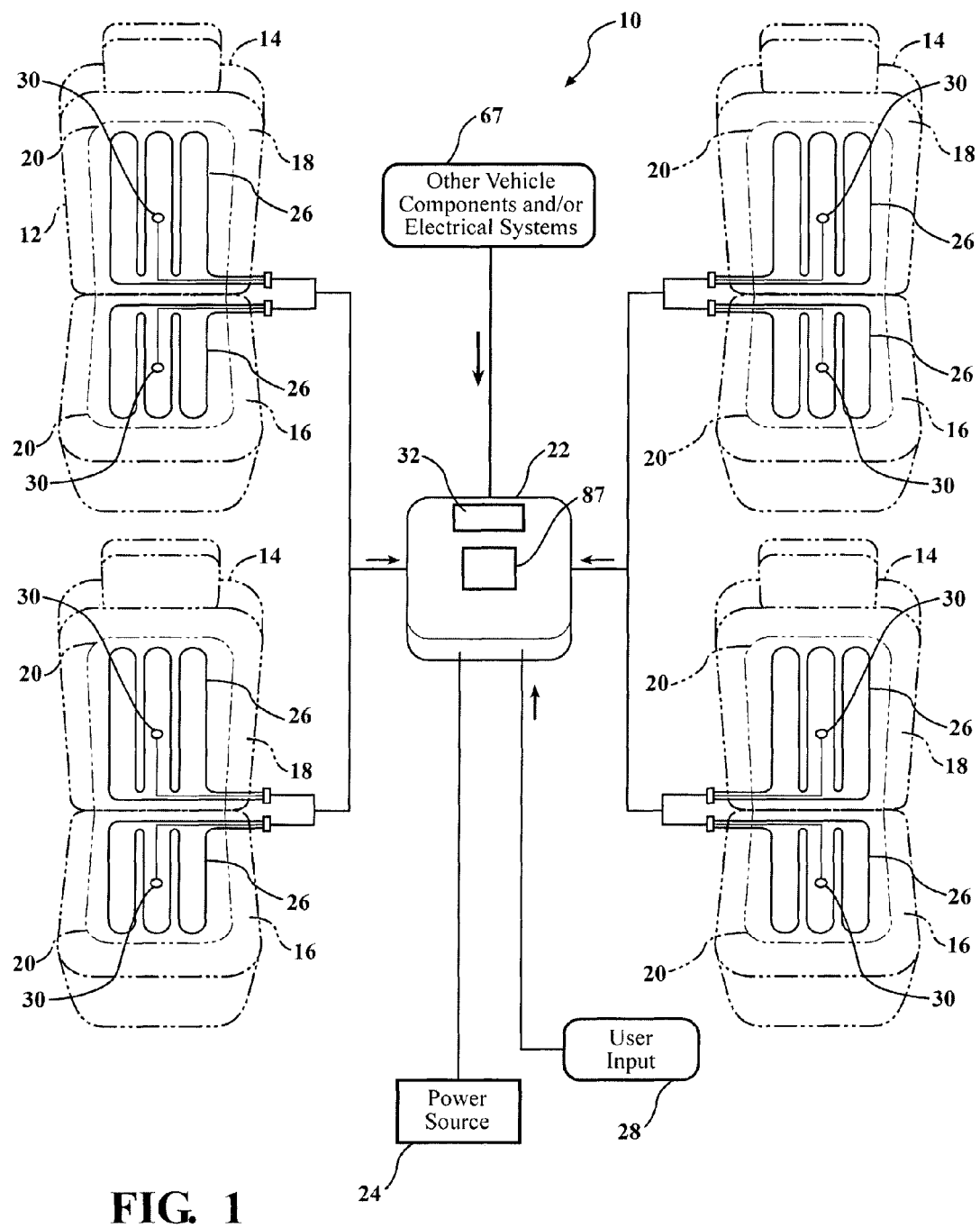
FIG. 1 is a plan view of a vehicle assembly including a plurality of heating zones each disposed in a cushion seating surface or a back seating surface of one of a plurality of vehicle seats and a controller for receiving heat demand information generated in relation to the activated heating zones, according to one embodiment of the present invention.

As shown in FIG. 1, the vehicle assembly 10 includes at least one vehicle component 12. The at least one vehicle component 12 is further defined as at least one of a vehicle seat 14, a steering wheel, a mirror, and a window. In the embodiment shown in FIG. 1, the at least one vehicle component 12 includes a plurality of vehicle seats 14. Each of the plurality of vehicle seats 14 has a cushion seating surface 16 and a back seating surface 18.

The vehicle assembly 10 includes a plurality of heating zones 20. The plurality of heating zones 20 are defined by the at least one vehicle component 12. Each of the heating zones 20 is configured to be activated and emit heat. For simplicity, the at least one vehicle component 12 will be hereinafter described and numbered according to the plurality of vehicle seats 14, as shown in FIG. 1, and the plurality of heating zones 20 will be described in relation to the plurality of vehicles seats 14.

Each of the plurality of heating zones 20 are disposed in at least one of the cushion and back seating surfaces 16, 18 of at least one of the plurality of vehicle seats 14. In one embodiment, as shown in FIG. 1, each of the cushion and back seating surfaces 16, 18 includes one of the plurality of heating zones 20. The plurality of heating zones 20 may be distributed among the plurality of vehicle seats 14 according to other configurations not specifically described herein without departing from the scope of the invention. Furthermore, the plurality of heating zones 20 may be distributed among any combination of vehicle components 12, such as the vehicle seat 14, the steering wheel, the mirror, and the window.

The vehicle assembly 10 includes a controller 22 which is in communication with the plurality of heating zones 20. The controller 22 is configured to control power to the plurality of heating zones 20. The controller 22 may be further defined as an electronic control unit (ECU). The controller 22 may include any suitable components or devices, such as microcontroller unit (MCU), for enabling the controller 22 to operate as described herein. Communication between the controller 22 and the various components described herein may be implemented according to any suitable communication method, such as controller area network (CAN) or local interconnect network (LIN).

In the embodiment shown in FIG. 1, the vehicle assembly 10 includes a single controller 22 which is in communication with the plurality of heating zones 20. In this embodiment, one controller 22 is shared among the plurality of heating zones 20. In another embodiment, the vehicle assembly 10 may include more than one controller 22. For example, the vehicle assembly 10 may include one controller 22 in communication with some of the heating zones 20 and another controller 22 in communication with other heating zones. In yet another embodiment, the each vehicle seat 14 may include a separate and dedicated controller 22. The plurality of controllers 22 may be in communication with one another. The vehicle assembly 22 may include various other controller(s) 22 layouts without departing from the scope of the invention.

A power source 24 is in communication with the controller 22 and is configured to provide power to the plurality of heating zones 20 and/or the controller 22. Typically, the power source 24 is further defined as a direct current (DC) power source, such as a vehicle battery.

Each of the plurality of heating zones 20 includes a heating source 26 disposed therein. The heating sources 26 are electrically connected to the controller 22. Each of the heating sources 26 is electrically actuatable and configured to emit heat in the respective heating zone 20. In one embodiment, each of the heating sources 26 is further defined as a heating element which is made of wire. The heating source 26 may be arranged in a grid or serpentine configuration throughout the respective heating zone 20.

A user input 28 may be in communication with the controller 22. In one embodiment, the user input 28 is configured to activate the heating zones 20. The user input 28 may be provided from any suitable device, such as an occupant switch or control panel. The user input 28 provides a signal to the controller 22 defining which of the heating zones 20 have been selected for activation. Additionally, the signal from the user input 28 may define the desired heating level, e.g., low, medium, high, associated with each of the activated heating zones 20. The user input 28 may provide other information to the controller 22 without departing from the scope of the invention.

A temperature sensor 30 may be in communication with the controller 22 for sensing a temperature of one of the activated heating zones 20. The temperature sensor 30 may be disposed in each of the activated heating zones 20. Alternatively, the temperature sensor 30 may be disposed in some of the activated heating zones 20 and not others. In one embodiment, the temperature sensor 30 is further defined as a thermistor, such as a negative temperature coefficient (NTC) thermistor. However, the temperature sensor 30 may have other configurations without departing from the scope of the invention.

As shown in FIG. 5, the method 50 of allocating power in the vehicle assembly 10 includes a step 52 of activating the heating zones 20. More specifically, the step 52 of activating the heating zones 20 is further defined as activating at least two of the plurality of heating zones 20 such that the heating zones 20 emit heat. In one embodiment, the user input 28 triggers activation of the heating zones 20. In another embodiment, the controller 22 triggers activation of the heating zones 20. The heating zones 20 may be activated according to any suitable method not specifically recited herein.

With activation of the heating zones 20, power is provided from the power source 24 to the heating zones 20. Each of the heating sources 26 are electrically actuated such that each heating source 26 emits heat in the respective heating zone 20. In embodiments where power is provided to the wire heating element, electrical current passes through the wire heating element causing the wire heating element to generate heat. Power may be provided to the heating zones 20 before activation of the heating zones 20 without departing from the scope of the invention.

The method 50 of allocating power in the vehicle assembly 10 includes a step 54 of generating heat demand information associated with the activated heating zones 20. The heat demand information may be generated according to any one or a combination of the following embodiments.

In one embodiment, as shown at step 56, the heat demand information is generated by sensing the temperature of each of the activated heating zones 20. In such instances, the heat demand information is further defined as of the temperature of at least one of the activated heating zones 20. The temperature sensor 30 may be implemented for sensing the temperature of any number of the activated heating zones 20.

In another embodiment, as shown at step 58, the heat demand information is generated by measuring an actual amount of power consumed by each of the activated heating zones 20. Here, the heat demand information is further defined as the actual amount of power consumed by each of the heating zones 20. As shown in FIG. 1, the vehicle assembly 10 may include a power monitor 32 which is configured to measure the actual amount of power consumed by each of the activated heating zones 20. In the embodiment as shown in FIG. 1, the power monitor 32 is integrated as part of the controller 22. In another embodiment, the power monitor 32 is separated from and in communication with the controller 22. The vehicle assembly 10 may include the power monitor 32 for measuring power consumed by the various electrical subsystems in the vehicle. The vehicle assembly 10 may employ any other suitable device and/or method for measuring the actual amount of power consumed by each of the heating zones 20.

In yet another embodiment, and as shown at step 60, the heat demand information is generated by determining an amount of power to be consumed by each of the heating zones 20. In such instances, the heat demand information is further defined as the amount of power to be consumed by each of the activated heating zones 20. The amount of power to be consumed may be predefined information stored in memory. The amount of power to be consumed may be provided from any suitable device, such as the controller 22 and/or the power monitor 32. Such predefined information may be based upon amounts of power historically consumed by each of the heating zones 20. For example, a specific heating zone 20 may historically consume 50 watts of power under certain circumstances. Such historic power consumption information may be stored in memory and accessed for future reference. The amount of power to be consumed may also be based on predefined design configuration information, such as a heating area defined by each of the heating zones 20. For example, the heating area defined by one of the heating zones 20 may be larger or smaller than the heating area defined by another one of the heating zones 20. Information regarding the size of the heating area may be stored in memory and accessed for future reference when determining the amount of power to be consumed. The amount of power to be consumed may also be based on predefined heating densities of various heating sources 26.

In another embodiment, as shown at step 62, the heat demand information is generated by receiving the signal provided from the user input 28. Here, the heat demand information may include signal information representing which of the heating zones 20 are activated, as shown at step 64, and/or the desired heating level associated with each of the activated heating zones 20, as shown at step 66.

As previously mentioned, the heat demand information may be generated from any single one or combination of the aforementioned embodiments. The heat demand information may be generated simultaneously or at different periods of time. Furthermore, the heat demand information may be generated at the controller 22 itself or at the various components in communication with the controller 22.

In conjunction with the heat demand information, power demand information associated with other vehicle components and/or electrical systems 67 may be generated, as shown at step 68. Referring to FIG. 1, such other electrical systems 67 are part of the vehicle assembly 10 but generally do not include the heating zones 20. Such other vehicle electrical systems 67 may include components from HVAC systems, vehicle lighting systems, infotainment systems, powertrain systems, and the like. These other vehicle electrical systems 67 demand and consume power. The power demand information generated with respect to such other vehicle electrical systems 67 may include any information generally relating to how much power is being demanded or consumed by such other vehicle electrical systems 67. Taking into account the power demand of other vehicle electrical system 67 increases the ability to manage overall electrical power consumption in the electrical system of the vehicle assembly 10.

The controller 22 is configured to receive the heat demand information generated in relation to the activated heating zones 20. As shown at step 70, the generated heat demand information is provided to the controller 22. The generated heat demand information may be provided to the controller 22 simultaneously or at different times. Additionally, the heat demand information may be provided to the controller 22 from the controller 22 itself or from the various components in communication with the controller 22. The controller 22 may include any suitable components for receiving the generated heat demand information. As shown at step 72, the generated power demand information associated with the other vehicle electrical systems 67 may be provided to the controller 22 in conjunction with the heat demand information.

The controller 22 is configured to determine an amount of power available for consumption by all of the activated heating zones 20 using the generated heat demand information. The method 50 of allocating power in the vehicle assembly 10 includes the step of utilizing the controller 22 to determine the amount of power available for consumption by all of the activated heating zones 20 using the generated heat demand information, as shown at 74. As will be described below, the controller 22 analyzes the generated heat demand information and actively establishes how much power to allocate towards the activated heating zones 20.

Figure 4:
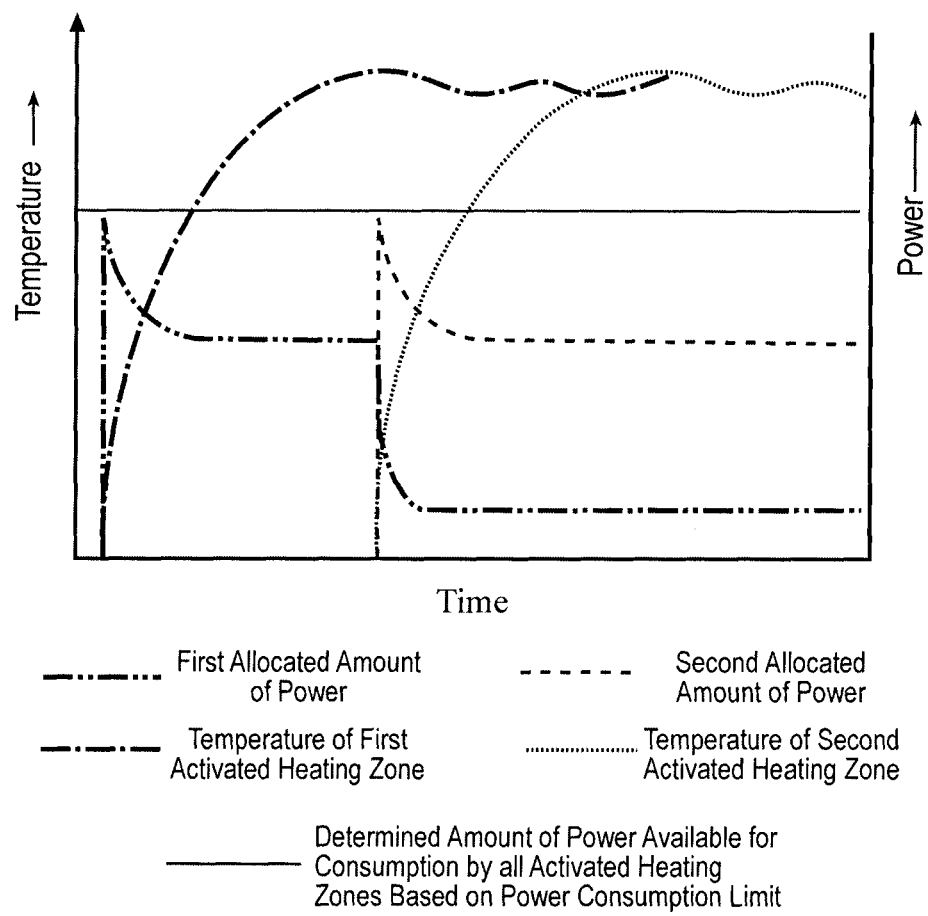
FIG. 4 is graph showing the determined amount of power available for consumption by all of the activated heating zones based on a power consumption limit, according to one embodiment of the present invention.

In one embodiment, the vehicle assembly 10 may include a plurality of power consumption limits which are selectable. As shown at step 78, the controller 22 determines the amount of power available for consumption by selecting one of the plurality of power consumption limits. An example of the power consumption limit is shown in the graph of FIG. 4. The power consumption limits are generally predefined. Each of the predefined power consumption limits may correspond to one of a number of combinations of heat demand information received by the controller 22. The power consumption limit may be defined according to any suitable parameter, such as percentage of total vehicle power available. For example, the power consumption limits may be defined as 50%, 25%, or 10% of the total vehicle power available. The power consumption limits may be included in the controller 22 itself or in any other suitable component which is in communication with the controller 22.

In conjunction with the heat demand information, the controller 22 may also be configured to determine the amount of power available for consumption by all of the activated heating zones 20 using the power demand information generated in association with other vehicle components and/or electrical systems 67, as shown at step 80. The controller 22 is configured to receive the power demand information from the other vehicle electrical systems 67 and/or from the power monitor 32. The controller 22 may take the power demand information into account when selecting one of the plurality of power consumption limits.

The controller 22 may determine the amount of power available for consumption according to any single one of or any combination of the aforementioned embodiments. Furthermore, the controller 22 may determine the amount of power available for consumption using the heat demand information according to any other suitable methods not specifically recited herein without departing from the scope of the invention.

Figure 3:
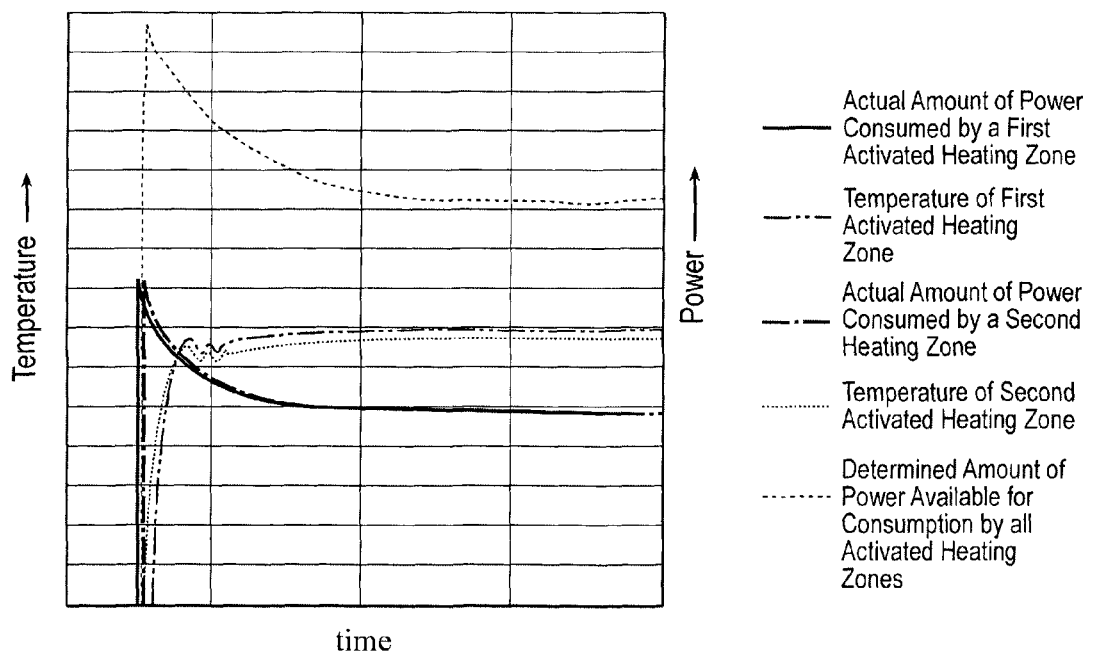
FIG. 3 is graph showing a determined amount of power available for consumption by all of the activated heating zones in relation to respective actual amounts of power consumed by first and second activated heating zones, according to one embodiment of the present invention.

The controller 22 is configured to actively allocate power between the activated heating zones 20 according to the determined amount of power available for consumption. The method 50 of allocating power in the vehicle assembly 10 includes the step 82 of actively allocating power between the activated heating zones 20 according to the determined amount of power available. As depicted in the graph shown in FIG. 3, the controller actively allocates power between the activated heating zones 20 such that an actual amount of power consumed by all of the activated heating zones 20 does not exceed the determined amount of power available. For example, if the determined amount of power available is 200 watts, the controller 22 allocates power such that the activated heating zones 20 in combination consume power in the range between 0 and 200 watts, but not exceeding 200 watts. The controller 22 is configured to actively allocate power between the activated heating zones 20 according to the determined amount of power available by utilizing of any single one of or combination of the following methods.

Figure 2:
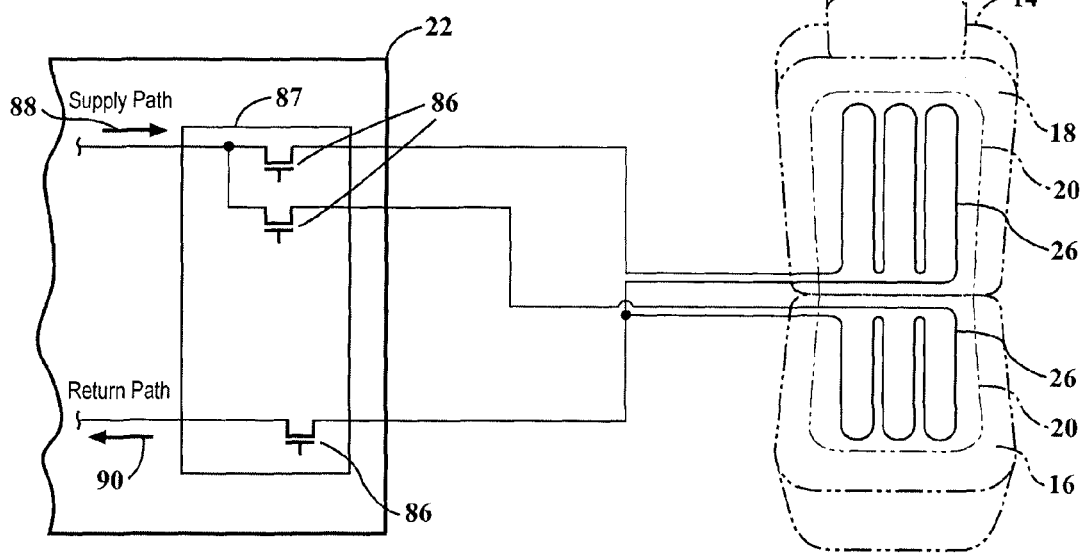
FIG. 2 is a circuit diagram of a switching device of the controller in communication with the heating zones in one of the vehicle seats, according to one embodiment of the present invention.

As shown in FIG. 2, the controller 22 may be in communication with one or a plurality of switching devices 86 for facilitating active allocation of power to each respective activated heating zone 20. The plurality of switching devices 86 may be further defined as transistors, such as metal-oxide-semiconductor field-effect transistors (MOSFETs). The switching devices 86 are operatively connected between the controller 22 and the respective heating zones 20. The switching devices 86 may be housed within a single switching unit 87 disposed within the controller 22. As shown in FIG. 2, the switching devices 86 are operatively connected between the controller 22 and the heating sources 26 disposed within the respective heating zones 20. The heating sources 26 each include a high side which is connected to a supply path 88 from the power source 24 and a low side which is connected to a return path 90 to the power source 24. In the embodiment as shown in FIG. 2, one switching device 86 is disposed between the supply path 88 and the high side of each heating source 26. The low side of each of the heating sources 26 is shared by one of the switching devices 86. As such, one switching device 86 is disposed between the low side of each heating source 26 and the return path 90. Such a configuration allows the controller 22 greater control in actively allocating power to the activated heating zones 20. The vehicle assembly 10 and/or controller 22 may employ any other suitable switching devices not specifically described herein without departing from the scope of the invention.

The controller 22 is configured to allocate power between the activated heating zone 20 in one of the cushion and back seating surfaces 16, 18 of one vehicle seat 14 and the activated heating zone 20 in one of the cushion and back seating surfaces 16, 18 of another vehicle seat 14. As such, the method 50 provides power allocation with respect to any combination of heating zones 20 which are active among any combination of vehicle seats 14. Furthermore, the controller 22 is also configured to allocate power between the activated heating zones 20 from any combination of the aforementioned vehicle components 12 having at least one of the heating zones 20.

In another embodiment, the controller 22 allocates power such that the actual amount of power consumed by all of the activated heating zones 20 is substantially equal to the determined amount of power available. For example, if the determined amount of power available is 50% of the total vehicle power available, the controller 22 may allocate power to the activated heating zones 20 such that the activated heating zones 20 in combination consume the entire 50% of the total vehicle power available without exceeding the determined amount of power available for consumption. The vehicle assembly 10 and method may employ such an embodiment to increase heat up time for the activated heating zones 20.

In yet another embodiment, as shown at step 96, the controller 22 actively allocates the determined amount of available power between the activated heating zones 20 according to a predetermined priority profile. The predetermined priority profile may prioritize the power allocation to certain activated heating zones 20 over others. For example, allocation of available power may be prioritized to vehicle seats 14 in the front of the vehicle before power is allocated to vehicle seats 14 in the rear of the vehicle. Similarly, allocation of available power may be prioritized to the driver vehicle seat 14 before the passenger vehicle seat 14. The predetermined priority profile may enable the controller 22 to allocate the determined amount of power between the various activated heating zones 20 simultaneously or sequentially.

The predetermined priority profile may be provided by the controller 22 itself or from any other suitable component in communication with the controller 22. In one embodiment, the predetermined priority profile is provided from the user input 28. A plurality of predetermined priority profiles may be available. An occupant of the vehicle may select a desired one of the plurality of predetermined priority profiles. The signal provided from the user input 28 to the controller 22 may include information representing the desired one of the plurality of predetermined priority profiles. The controller 22 receives the signal and actively allocates the determined amount of available power between the activated heating zones 20 according to desired on of the predetermined priority profiles. In another embodiment, the predetermined priority profile is triggered in the event that available power in the vehicle assembly 10 is suddenly reduced to a level which is lower than the predetermined amount of power available. In such instances, the controller 22 may utilize the predetermined priority profile to prioritize allocation of available power to certain vehicle seats 14 over others in order to minimize the effects of the sudden restriction of available power. The plurality of predetermined priority profiles may be stored in memory in any suitable component and later accessed.

In still another embodiment, the controller 22 actively allocates power simultaneously and variably between the activated heating zones 20. For example, as depicted in the graph shown in FIG. 4, the controller 22 actively allocates a first amount of power to a first heating zone 20 upon activation of the first heating zone 20. The controller 22 actively and simultaneously allocates a second amount of power to a second heating zone 20 upon activation of the second heating zone 20. The controller 22 actively varies the first amount of power in response to activation of the second heating zone 20 such that the actual amount of power consumed by the first and second heating zones 20 do not in combination exceed the determined amount of power available. In other words, the first and second amounts of power do not exceed the determined amount of power available.

As shown at step 100, the controller 22 may actively allocate power between the activated heating zones 20 according to the determined amount of power available in conjunction with the heat demand information which is used to determine the amount of power available. As such, the purpose of the heat demand information is not limited to merely determining the amount of power available for consumption. The heat demand information may be taken into account when actively allocating the determined amount of power available.

In one embodiment, as shown at step 102, the controller 22 actively allocates power in accordance with the heat demand information provided from the user input 28. For instance, the controller 22 allocates power to each of the activated heating zones 20 in proportion to how many of the heating zones 20 are activated. The controller 22 and/or any other suitable component may determine how many of the plurality of heating zones 20 are activated to define a number of heating zones 20 that are activated. Thereafter, the controller 22 actively allocates the determined amount of power available to each of the activated heating zones 20 in proportion to the number of the activated heating zones 20. In one example, the number of activated heating zones 20 may be determined as four. Here, the controller 22 actively allocates 25% of the determined amount of power available to each of the four activated heating zones 20. It is to be appreciated that the number of the activated heating zones 20 may be defined independent of the user input 28, as shown at step 103. The controller 22 may also allocate power in accordance with the desired heating level for each activated heating zone 20 which is provided by the signal from the user input 28. For example, one of the activated heating zones 20 may demand a high level of heat and another one of the activated heating zones 20 may demand a low level of heat. In such instances, the controller 22 may actively allocate more power to the activated heating zone 20 demanding the high level of heat as compared to the activating heating zone 20 demanding the low level of heat. It is to be appreciated that the desired heating level for each activated heating zone 20 may be provided independent of the user input 28. As described above, the controller 22 may also allocate power in accordance to the predetermined priority profile which is provided by the user input 28. However, the predetermined priority sequence may be provided independent of the user input 28.

In another embodiment, as shown at step 104, the controller 22 actively allocates power to each of the activated heating zones 20 by considering the temperature of each of the activated heating zones 20. For example, if the temperature of one of the activated heating zones 20 falls below a predefined threshold temperature, the controller 22 actively allocates more power to that activated heating zone 20. In so doing, the controller 22 allocates power away from another activated heating zone 20 to compensate for increasing power allocation to the activated heating zone 20 falling below the predefined threshold temperature. Similarly, if the temperature of one of the activated heating zones 20 rises above a predefined threshold temperature, the controller 22 may actively allocate power away from that activated heating zone 20 and allocate more power to another activated heating zone 20.

In yet another embodiment of actively allocating power according to the generated heat demand information, the controller 22 actively allocates power by considering the actual amount of power consumed, as shown at step 106. For example, the controller 22, the power monitor 32, and/or any other suitable device may determine that the actual amount of power being consumed by one of the activated heating zones 20 has reached a specific threshold. Based on this actual amount of power being consumed, the controller 22 may actively allocate less power to that activated heating zone 20. The controller 22 may allocate power according to the actual power consumed according to other suitable methods not specifically recited herein. Furthermore, as shown at step 108, the controller 22 may actively allocate power by considering the predefined amount of power to be consumed by each of the activated heating zones.

The controller 22 may consider the power consumption limit when actively allocating power between the activated heating zones 20 according to the determined amount of power available, as shown at step 110. The controller 22 actively allocates power between the activated heating zones 20 according to the determined amount of power available such that the actual amount of power consumed by all of the activated heating zones 20 does not exceed the amount of power available which was determined by selection of one of the plurality of power consumption limits.

In yet another embodiment, as shown at step 112, the controller considers the power demand information generated from the other vehicle electrical systems 67 when actively allocating power between the activated heating zones 20 according to the determined amount of power available. Here, the controller 22 may consider any information generally relating to how much power is being demanded or consumed by such other vehicle components and/or electrical systems 67 when actively allocating power.

As mentioned above, the controller 22 is configured to actively allocate power between the activated heating zones 20 according to the determined amount of power available such that the actual amount of power consumed by all of the activated heating zones does not exceed the determined amount of power available for consumption. The controller 22 may do so by utilizing any single one or combination of the aforementioned methods.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of allocating power in a vehicle assembly, the vehicle assembly including a plurality of vehicle seats each having a cushion seating surface and a back seating surface, a plurality of heating zones each being disposed in at least one of the cushion and back seating surfaces of at least one of the plurality of vehicle seats, and a controller configured to control power to the plurality of heating zones, the method comprising the steps of:
    activating at least two of the plurality of heating zones such that the heating zones emit heat;
    generating heat demand information associated with the activated heating zones;
    providing the generated heat demand information to the controller;
    utilizing the controller to determine an amount of power available for consumption by all of the activated heating zones using the heat demand information; and
    actively allocating power between the activated heating zones according to the determined amount of power available such that an actual amount of power consumed by all of the activated heating zones does not exceed the determined amount of power available.

2. The method as set forth in claim 1 further including a plurality of power consumption limits which are selectable, and wherein the step of utilizing the controller is further defined as determining the amount of power available for consumption by selecting one of the plurality of power consumption limits and wherein the step of actively allocating power is further defined as actively allocating power according to the selected one of the plurality of power consumption limits.

3. The method as set forth in claim 1 further including the step of determining how many of the plurality of heating zones are activated to define a number of heating zones that are activated, and wherein the step of actively allocating power is further defined as actively allocating power to each of the activated heating zones in proportion to the number of the activated heating zones.

4. The method as set forth in claim 1 wherein the step of generating heat demand information is further defined as at least one of measuring an actual amount of power consumed by each of the heating zones and determining an amount of power to be consumed by each of the heating zones.

5. The method as set forth in claim 1 wherein the vehicle assembly includes vehicle components other than the heating zones which consume power, and further including the step of generating power demand information associated with the other vehicle components, providing the generated power demand information to the controller, and utilizing the controller to determine the amount of power available for consumption by all of the activated heating zones using the generated power demand information in conjunction with the heat demand information.

6. The method as set forth in claim 1 wherein the step of actively allocating power is further defined as at least one of (i) actively allocating power such that the actual amount of power consumed by all of the activated heating zones is substantially equal to the determined amount of power available for consumption and (ii) actively allocating power between the activated heating zones according to a predetermined priority profile.

7. The method as set forth in claim 1 wherein the plurality of heating zones includes a first heating zone and a second heating zone, and further including the step of actively allocating a first amount of power to the first heating zone upon activation of the first heating zone, actively allocating a second amount of power to the second heating zone upon activation of the second heating zone, and actively varying the first amount of power in response to activation of the second heating zone.

8. The method as set forth in claim 1 wherein the step of actively allocating power is further defined as actively allocating power between the activated heating zone in one of the cushion and back seating surfaces of one vehicle seat and the activated heating zone in one of the cushion and back seating surfaces of another vehicle seat.

9. The method as set forth in claim 1 further including the step of receiving a user input to determine at least one of which of the heating zones are activated and a desired heating level associated with each of the activated heating zones, and wherein the step of generating heat demand information is further defined as receiving the user input.

10. A vehicle assembly comprising:
    a plurality of vehicle seats each having a cushion seating surface and a back seating surface;
    a plurality of heating zones each being disposed in at least one of said cushion and back seating surfaces of at least one of said plurality of vehicle seats, each of said heating zones being configured to be activated and emit heat; and
    a controller configured to control power to said plurality of heating zones and receive heat demand information generated in relation to said activated heating zones;
    wherein said controller is configured to determine an amount of power available for consumption by all of said activated heating zones using said heat demand information, and wherein said controller is configured to actively allocate power between said activated heating zones according to said determined amount of power available such that an actual amount of power consumed by all of said activated heating zones does not exceed said determined amount of power available.

11. The vehicle assembly of claim 10 further including a plurality of power consumption limits which are selectable, wherein said controller is configured to determine said amount of power available for consumption by selecting one of said plurality of power consumption limits and wherein said controller is configured to actively allocate power according to said selected one of said plurality of power consumption limits.

12. The vehicle assembly of claim 10 wherein said controller is configured to allocate power to each of said activated heating zones in proportion to how many of said heating zones are activated.

13. The vehicle assembly of claim 10 further including a power monitor configured to determine at least one of an actual amount of power consumed by each of said activated heating zones and an amount of power to be consumed by each of said activated heating zones, and wherein said controller is configured to allocate power to said activated heating zones according to at least one of said actual amount of power consumed and said amount of power to be consumed.

14. The vehicle assembly of claim 10 wherein said controller is configured to allocate power such that said actual amount of power consumed by all of said activated heating zones is substantially equal to said determined amount of power available.

15. The vehicle assembly of claim 10 wherein said controller is configured to allocate power simultaneously and variably between said activated heating zones.

16. The vehicle assembly of claim 10 wherein said controller is configured to actively allocate power between said activated heating zones according to a predetermined priority profile.

17. The vehicle assembly of claim 10 wherein said controller is configured to allocate power between said activated heating zone in one of said cushion and back seating surfaces of one vehicle seat and said activated heating zone in one of said cushion and back seating surfaces of another vehicle seat.

18. The vehicle assembly of claim 16 further including a user input for activating said heating zones, and wherein said controller is configured to receive said user input to determine at least one of how many of said heating zones are activated, a desired heating level associated with each of said activated heating zones, and which of said predetermined priority profiles is selected.

19. The vehicle assembly of claim 10 wherein said vehicle assembly includes vehicle components other than said heating zones which consume power, wherein said controller is configured to receive power demand information generated in relation to said other vehicle components, and wherein said controller is configured to determine said amount of power available for consumption by all of said activated heating zones using said generated power demand information in conjunction with said heat demand information.

20. A vehicle assembly comprising:
at least one vehicle component;
a plurality of heating zones defined by said at least one vehicle component, each of said heating zones being configured to be activated and emit heat; and
a controller configured to control power to said plurality of heating zones and receive heat demand information generated in relation to said activated heating zones;
wherein said controller is configured to determine an amount of power available for consumption by all of said activated heating zones using said heat demand information, and wherein said controller is configured to actively allocate power between said activated heating zones according to said determined amount of power available such that an actual amount of power consumed by all of said activated heating zones does not exceed said determined amount of power available.

21. The vehicle assembly as set forth in claim 20 wherein said at least one vehicle component is further defined as at least one of a vehicle seat, a steering wheel, a mirror, and a window.

22. The vehicle assembly as set forth in claim 21 wherein said heat demand information is defined as at least one of a temperature of each of said activated heating zones, an actual amount of power consumed by each of said activated heating zones, an amount of power to be consumed by each of said activated heating zones, a number of said heating zones which are activated, a desired heating level associated with each of said activated heating zones, and a selected one of a plurality of predetermined priority profiles.

23. The vehicle assembly as set forth in claim 22 wherein said controller is configured to allocate power to said activated heating zones according to at least one of said temperature of each of said activated heating zones, said actual amount of power consumed by each of said activated heating zones, said amount of power to be consumed by each of said activated heating zones, said number of said heating zones which are activated, said desired heating level associated with each of said activated heating zones, and said selected one of said plurality of predetermined priority profiles.

24. The vehicle assembly as set forth in claim 20 further including a plurality of power consumption limits which are selectable, wherein said controller is configured to determine said amount of power available for consumption by selecting one of said plurality of power consumption limits, and wherein said controller is configured to simultaneously and variably allocate power between said activated heating zones according to said selected one of said plurality of power consumption limits.

25. The vehicle assembly as set forth in claim 20 wherein the vehicle assembly includes vehicle components other than said heating zones which consume power, wherein said controller is configured to receive power demand information generated in relation to said other vehicle components, and wherein said controller is configured to determine said amount of power available for consumption by all of said activated heating zones using said power demand information in conjunction with said heat demand information.

* * * * *